US012748798B2

(12) United States Patent
Siripurapu

(10) Patent No.: US 12,748,798 B2
(45) Date of Patent: Sep. 29, 2026

(54) PROMPT GENERATION FOR GENERATIVE ARTIFICIAL INTELLIGENCE MODELS

(71) Applicant: Canva Pty Ltd, Surry Hills (AU)

(72) Inventor: Rahul Siripurapu, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/286,155

(22) Filed: Jul. 30, 2025

(65) Prior Publication Data

US 2026/0134022 A1 May 14, 2026

(30) Foreign Application Priority Data

Nov. 8, 2024 (AU) ................................ 2024259830

(51) Int. Cl.
*G06F 16/335* (2019.01)

(52) U.S. Cl.
CPC .................................. *G06F 16/337* (2019.01)

(58) Field of Classification Search
CPC ..................................................... G06F 16/337
See application file for complete search history.

(56) References Cited

U.S. PATENT DOCUMENTS 11,995,803 B1 * 5/2024 Karpman .................. G06T 5/70
2022/0005235 A1 1/2022 Gou et al.
2024/0295953 A1 9/2024 Zakharov et al.
2025/0111235 A1 * 4/2025 Qiao ........................ G06N 3/08
2026/0037572 A1 * 2/2026 Kim ....................... G06F 16/535
2026/0080895 A1 * 3/2026 Lin .......................... G10L 25/51
2026/0089128 A1 * 3/2026 Pathak ..................... H04L 51/10
2026/0101081 A1 * 4/2026 He ......................... G06V 10/82

FOREIGN PATENT DOCUMENTS

EP 4432130 A1 9/2024

OTHER PUBLICATIONS

Agarwal, S. et al., "Approximate Caching for Efficiently Serving Diffusion Models," arXiv preprint arXiv:2312.04429, Dec. 7, 2023, pp. 1-16.

Kim, M. et al., "Personalized Text-to-Image Model Enhancement Strategies: SOD Preprocessing and CNN Local Feature Integration," Electronics, 2023, pp. 1-24.

* cited by examiner

*Primary Examiner* — Merilyn P Nguyen
(74) *Attorney, Agent, or Firm* — GrowIP Law Group LLC

(57) ABSTRACT

A computer-implemented method for generating a prompt for a generative machine learning model is described. A user text prompt is encoded by an encoder implementing an encoding process, into a text embedding. The encoded text prompt is used to identify text embeddings in a vector database. The text embeddings in the vector database correspond to training captions used to train the generative machine learning model encoded using the encoding process. The identified text embeddings are used to generate a modified prompt. A large language model may be used to generate the modified prompt based on the identified text embeddings. The modified prompt may be passed to a generative machine learning model to generate media or one or more digital assets, such as a text-to-image machine learning model to generate one or more images.

20 Claims, 5 Drawing Sheets

PROMPT GENERATION FOR GENERATIVE ARTIFICIAL INTELLIGENCE MODELS

CROSS REFERENCE TO RELATED APPLICATION

This application is a U.S. Non-Provisional Application that claims priority to Australian Patent Application No. 2024259830, filed Nov. 8, 2024, which is hereby incorporated by reference in its entirety.

TECHNICAL FIELD

Aspects of the present disclosure are directed to systems and methods for generating prompts for artificial intelligence (AI) models trained using textual inputs. Certain embodiments relate to using machine learning (ML) models to generate media or digital assets based on text prompts.

BACKGROUND

Generative ML models have been developed that can generate media or other digital assets based on a prompt. The prompt may be a text prompt provided by a user. For example, various ML models exist for creating images, audio or speech, video, 3D models or objects, music or musical compositions, diagrams or charts, or computer code based on a text prompt.

The effectiveness of a generative ML model to generate media or digital assets that align with the requirements of a user can be variable. Different users may experience varying levels of success with any given system implementing a ML model, depending in part on the prompt they provide.

SUMMARY

A computer-implemented method for generating a prompt for a generative machine learning model is described. A user text prompt is encoded by an encoder implementing an encoding process, into a text embedding. The encoded text prompt is used to identify text embeddings in a database. The identified text embeddings are used to generate a modified prompt.

In some embodiments the text embeddings in the database correspond to training captions used to train the generative machine learning model encoded using the encoding process.

In some embodiments a large language model is used to generate the modified prompt based on the identified text embeddings.

The modified prompt may be passed to a generative machine learning model to generate media or one or more digital assets, such as a text-to-image machine learning model to generate one or more media items or digital assets. A computer-implemented method for generating media items or digital assets includes passing the modified prompt to a generative machine learning model.

A computer-implemented method for generating media items or digital assets, includes:

- receiving a text prompt;
- encoding, by an encoder implementing an encoding process, the text prompt into a text embedding;
- identifying one or more similar text embeddings to the encoded text prompt from a database of text embeddings, wherein the text embeddings in the database comprise or consist of training captions that were used to train a generative machine learning model encoded using the encoding process;
- retrieving one or more training captions corresponding to the identified one or more similar text embeddings;
- forming a modified prompt based on the retrieved training captions; and
- providing the modified prompt to the generative machine learning model to generate one or more media items or digital assets.

In some embodiments forming the modified prompt includes combining the received text prompt with the one or more retrieved training captions. In other embodiments the modified prompt does not include the received text prompt.

In some embodiments forming the modified prompt includes generating the modified prompt using a large language model, wherein the large language model generates the modified prompt based on text input comprising at least the one or more retrieved training captions. The text input may include both the received text prompt and the one or more retrieved training captions. The text input may instead include the one or more retrieved training captions without the received text prompt.

In some embodiments the one or more similar text embeddings are one or more near neighbour text embeddings.

In some embodiments the one or more similar text embeddings consist of at least three near neighbour text embeddings.

In some embodiments the encoder comprises a large pre-trained language processing model.

In some embodiments the one or more similar text embeddings comprise or consist nearest neighbour text embeddings to the encoded text prompt.

A computer-implemented method for generating a prompt for a generative machine learning model includes:

- receiving a text prompt;
- encoding, by an encoder implementing an encoding process, the received text prompt into a text embedding;
- identifying one or more similar text embeddings to the encoded text prompt from a database of text embeddings, wherein the text embeddings in the database comprise or consist of training captions used to train the generative machine learning model encoded using the encoding process;
- retrieving one or more training captions corresponding to the identified one or more similar text embeddings; and
- generating a modified prompt based on the retrieved training captions.

In some embodiments the method further includes providing the modified prompt to the generative machine learning model.

In some embodiments forming the modified prompt comprises generating the modified prompt using a large language model, wherein the large language model generates the modified prompt based on text input including at least the one or more retrieved training captions. The text input may include both the received text prompt and the one or more retrieved training captions.

In some embodiments the one or more similar text embeddings consist of a plurality of near neighbour text embeddings.

In some embodiments the one or more similar text embeddings consist of at least three near neighbour text embeddings.

In some embodiments the encoder comprises a large pre-trained language processing model.

In some embodiments the received text prompt comprises or consists of text entered by a user.

Also described is a computer processing system, including: one or more processing units; and one or more non-transitory computer-readable storage storing instructions, which when executed by the one or more processing units, cause the one or more processing units to perform a method as described above.

Also described is one or more non-transitory storage storing instructions executable by one or more processing units to cause the one or more processing units to perform a method as described above.

Figure 1:
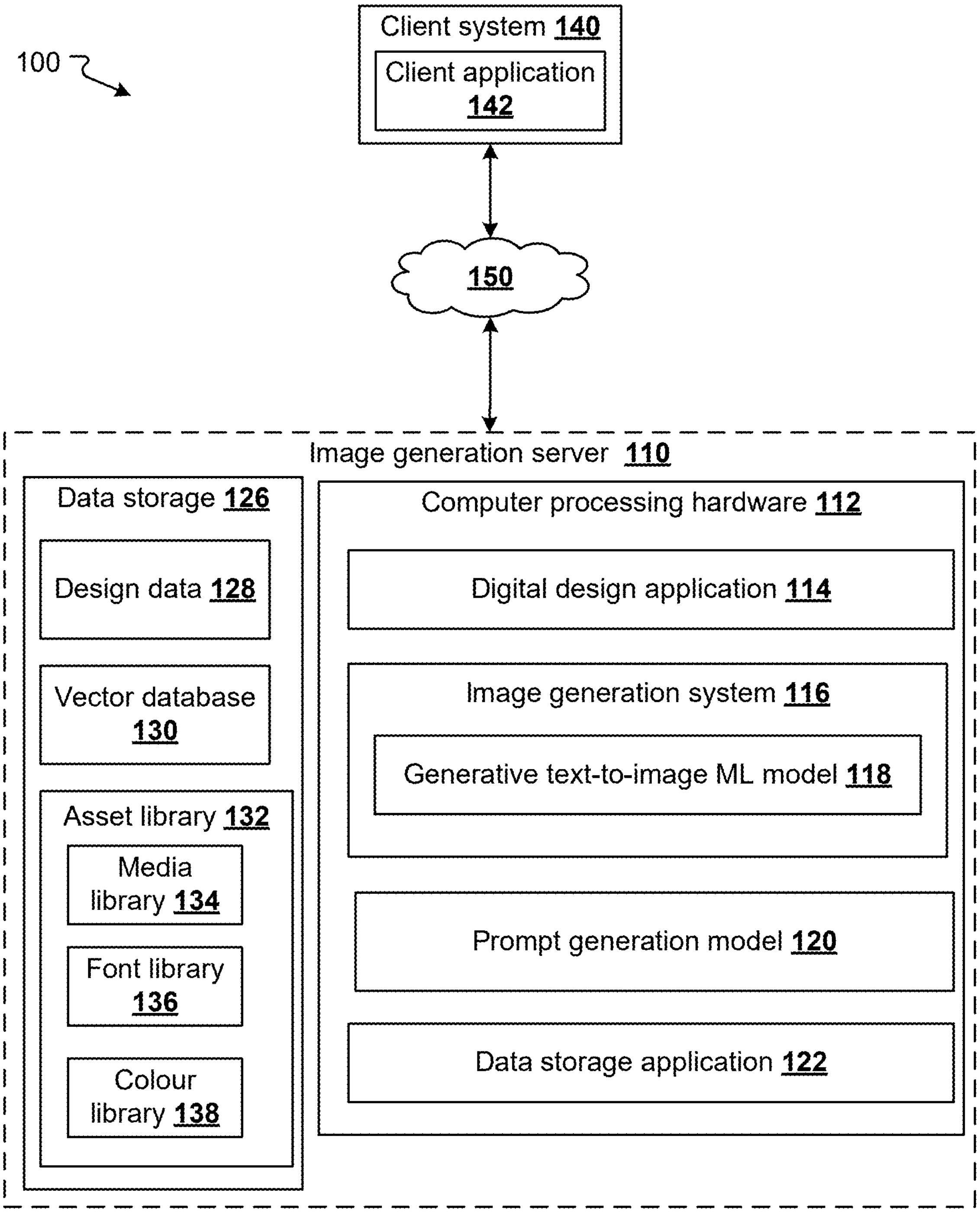
FIG. 1 is a block diagram depicting a networked environment in which various features of the present disclosure may be implemented.

Specific embodiments are shown by way of example in the drawings and are described in detail. It should be understood, however, that the drawings and detailed description are not intended to limit the invention to the particular form disclosed.

DETAILED DESCRIPTION

In the following description, numerous specific details are set forth to provide a thorough understanding of the present disclosure. It will be apparent, however, that the present invention may be practiced without these specific details. In some instances, well-known structures and devices are shown in block diagram form or are omitted to avoid unnecessary obscuring.

Aspects of the present disclosure may be utilized for or in systems and methods for creating media or digital assets using a generative machine learning (ML) model. In particular, the techniques disclosed herein are described in the context of a computer application that is configured to facilitate the creation of media or digital assets by a ML model based on a text prompt.

The creation of the media or digital assets may be automatic. The computer system running the computer application may generate, or cause to be generated by another computer system configured with a ML model, a media item or digital asset based on a user request without the need for additional user input. The user request includes a text prompt. The computer system may generate a media item or digital asset based on the text prompt and the user does not need to provide any input that directly forms part of the generated media item or digital asset. The computer system may generate, or cause to be generated, one media item or digital asset or a plurality of different media items or digital assets. In the case of generation of a plurality of different media items or digital assets, a user may select one or more of the media items or digital assets for use or further action. In some embodiments, in response to user input that includes the user selection of one of a plurality of generated media items or digital assets, the computer system generates, or causes to be generated, a corresponding media item or digital asset with one or more different parameters, for example a higher resolution.

In some use cases of ML models there is a distribution shift, a mismatch between the distribution of data the ML model was trained on and the distribution of data the ML model encounters during deployment or use. Distribution shift may be caused by differences between training captions used during training of a ML model and text prompts provided to the trained ML model during use of the trained ML model. These differences may result in sub-optimal generation results. For example, the model may struggle to generate relevant, high-quality output for text prompts that are outside the training data distribution, or the model may not be able to effectively handle uncommon, novel or unseen text prompts or the model may not be able to generate output that diverges from the training data.

Aspects of the present disclosure provide systems, methods, and/or computer readable media that are configured to facilitate generation of a modified text prompt for a generative ML model that is different to a received text prompt. The modified text prompt is formed based on the text prompt and is formed in a way that may address one or more of the problems that arise from distribution shift, at least in some use cases. In some embodiments the modified text prompt incorporates the received text prompt; the modified text prompt may be viewed as an expanded prompt. In some embodiments the modified text prompt replaces the received text prompt.

Distribution shift can be addressed using a large language model (LLM) to expand the received text prompt. This has been found to be a partial solution as, for example, the LLM may not understand the task if there is insufficient context. This partial solution can be replaced or supplemented by retrieving near training captions to the received text prompt and providing these to the LLM.

The received text prompt may be a user provided text prompt and the following description of embodiments is provided with reference to that specific use case or example. The received text prompt may directly correspond to text entered by a user or may include the text entered by a user plus additional text, such as system text appended or prepended to the user entered text, which may have been developed due to prompt engineering or prompt design. The received text prompt may be otherwise based on user entered text, for example subject to processing by a rule-based application or function or by a ML model, which could be a different ML model to the LLM referred to above, or the same LLM with a different prompt. In other embodiments, the genesis of text in the received text prompt may not be text entered by a user. For example, the received text may be received from another computer system or generated based on another input, such as an image.

To determine the near training captions to the user text prompt a vector database, or another suitable database or set of structured data for finding similar text embeddings such as nearest neighbours, is used. A vector database includes vectors that have been or are formed by generating, using an encoder, text embeddings from training captions. The training captions correspond to those used to train a ML model.

The vector database may therefore be viewed as being configured for that trained ML model. In the following it is assumed that the determination of the similar or near training captions is a result of a nearest neighbour search and the nearest neighbour or neighbours identified in the search are used. This does not exclude other options for identifying similarity, for example taking the first, second and fourth nearest neighbours, using an approximate nearest neighbour search, or using another method for identifying similarity between text embeddings. Further, unless explicitly stated otherwise, references herein to a caption being a nearest neighbour refers to the caption being found in a nearest neighbour search and does not require that the caption (or captions) to be the nearest of all captions found in the search. In systems configured to form a plurality of different modified text prompts and a corresponding plurality of media items or digital assets based on the modified text prompts, different combinations of near training captions may be used to form the different modified text prompts.

In some embodiments the encoder is based on a large pre-trained language model. The text embeddings may be generated using the model and stored in the vector database. The inventors have developed and tested an example using the encoder of a T5 model, in particular using Sentence-T5-xl as the encoder. Further details are provided later herein. Other methods suitable for encoding text into a text embedding or vector may be used.

To determine the near training captions to the user text prompt, the user text prompt is similarly encoded into a text embedding, using the same encoding process that was used to form the vector database. A nearest neighbour search is conducted to find the most similar text embeddings in the vector database to the encoded user text prompt (or at least those deemed the most similar based on the encoding). The nearest neighbour search may be conducted based on a distance metric, such as Euclidean distance.

At least one nearest neighbour text embedding is used. In some embodiments two, three, four or five nearest neighbour text embeddings are used. In some embodiments more than five nearest neighbour text embeddings are used, for example a number between 6 and 10 (inclusive), a number between 10 and 20 (inclusive), a number between 20 and 50 (inclusive), of a number greater than 50. As described later herein, the inventor in testing found useful results using three nearest neighbour text embeddings.

The training caption corresponding to each of the one or more nearest neighbour text embeddings is retrieved from the vector database and used to create a modified prompt. The modified prompt is based on the one or more nearest training captions that correspond to the nearest neighbour text embeddings. In some embodiments the modified prompt expands the user text prompt based on the one or more nearest training captions.

In two simple embodiments the modified prompt passed to the ML model is either a) the user text prompt concatenated or otherwise combined, for example into a sentence or structured item of text, with the one or more nearest training captions (which are also concatenated or otherwise combined in the same manner in embodiments in which there are two or more nearest training captions), or b) the user text prompt replaced with the one or more nearest training captions (again, concatenated in embodiments in which there are two or more nearest training captions). Retaining the text prompt may provide results that, on average and relative to replacing the text prompt, more closely reflect the user's intent, particularly if the text prompt represents something novel that is not reflected in the text captions used for training.

In other embodiments, the modified prompt passed to the ML model is generated by a LLM based on either a) both the user text prompt and the one or more nearest training captions, or b) the one or more nearest training captions and not the user text prompt. For example, an intermediate text prompt may be formed that is either a) the user text prompt concatenated or otherwise combined, for example into a sentence or structured item of text, with the one or more nearest training captions (which are also concatenated or otherwise combined in the same manner in embodiments in which there are two or more nearest training captions), or b) the user text prompt replaced with the one or more nearest training captions (again, concatenated or otherwise combined in embodiments in which there are two or more nearest training captions). The intermediate text prompt may then be input into the LLM, which generates the modified prompt.

If the LLM is a general purpose LLM, the input to the LLM includes the intermediate text prompt and configuration data, which provides instructions to the LLM to generate the modified prompt. The configuration data may be a text instruction to the LLM, which is combined with the intermediate text prompt. In a simple example, the configuration data may be the text "Generate a text prompt for a text-to-image ML model based on the following information: {intermediate text prompt}", in which "{intermediate text prompt}" is the text of the intermediate text prompt. Many other possibilities for a configuration of an LLM are possible. Alternatively, the LLM may be a specific ML model that has already been trained for the specific task of generating the modified prompts based on intermediate text prompts, in which case only the intermediate text prompt may be passed to the LLM without any configuration data directing the LLM to generate a prompt for a ML model. Optionally, in either case, configuration data that specifies additional parameters may be provided. In the context of a text-to-image ML model, an example of an additional parameter may be to specify in the prompt that a particular style of image (e.g. photo-realistic) is required. Other prompt engineering may be performed, for example to assist to remove bias.

In some embodiments a single media item or digital asset is generated and in others a plurality of media items or digital assets are generated. When generating a plurality of media items or digital assets, all of the media items or digital assets may be based on identified near training captions or at least one and less than all of the media items or digital assets may be based on identified near training captions. For example, one media item or digital asset may be generated by the ML model based on the user prompt as originally supplied or modified according to a method not based on the nearest training captions and one or more media items or digital assets generated using a corresponding one or more modified prompts that are based on the nearest training captions. A plurality of modified prompts may be formed in a variety of ways. Examples include selecting different combinations of nearest training captions, providing the LLM with different configuration data together with the intermediate training prompt, or requesting the LLM to produce two or more different prompts based on the same intermediate training prompt. Optionally, when a plurality of media items or digital assets are generated, the generated media items or digital assets may be presented to a user, who may then select a media item or digital asset they wish to utilise.

Further details are described with reference to the accompanying figures. The details are given with reference to the specific use case or example of prompts for ML models that are text-to-image ML models. This is not intended to be limiting, and it will be understood that the details of the embodiments described with reference to the accompanying figures have application to other ML models that generate other media or digital assets. Certain embodiments relate to models that have been trained based on a design data set. The design data set may include a training set that includes text captions. The design data set may also include a validation set, a test set, or both.

Example ML models include OpenAI DALL-E 2 (https://openai.com/index/dall-e-2/ at 21 Oct. 2024) and Stable Diffusion (https://stability.ai/stable-image at 21 Oct. 2024) for creating images from text prompts. GPT-4 (https://openai.com/index/gpt-4/ at 21 Oct. 2024) generates text, including articles, stories, and code, from textual inputs. Jukebox (https:/openai.com/index/jukebox/ at 21 Oct. 2024) can generate original music compositions and songs from lyrical inputs. An example design generator is the current applicant's Magic Design™ (https:/www.canva.com/magic-design/ at 21 Oct. 2024).

The further details also include details of example environments in which the invention may be performed. The example environment is a networked environment in which the functionality of the present disclosure is largely provided by a computer server. This is also not intended to be limiting of the present disclosure, and it will be understood that other environments may be used. For example, the techniques and processing described herein could be adapted to be executed in a stand-alone context—e.g. by an application (or set of applications) that run on a computer processing system and can perform all required functionality without need of a server environment or application. Functionality described herein as performed by instructions run or executed by a processor may be replaced by dedicated hardware or firmware configured to perform some the functionality. In this specification sue of hardware or firmware is intended to fall within the scope of computer implementation. For example, a computer implemented method may be performed by a processor running or executing instructions or performed by hardware or configured firmware.

FIG. 1 is a block diagram depicting a networked environment 100 in which various features of the present disclosure may be implemented. The environment 100 includes server- and client-side applications, which operate together to perform the processing described herein. The environment 100 includes an image generation server 110 and a client system 140, which communicate via one or more communications networks 150 (e.g., the Internet).

The image generation server 110 includes computer processing hardware 112 (discussed below) on which applications that provide server-side functionality execute. The server-side functionality is provided to client applications such as client application 142 (described below). In the present example, the image generation server 110 includes a digital design application 114, an image generation system 116, a prompt generation model 120, and a data storage application 122.

The digital design application 114 may execute to provide a client application endpoint that is accessible over the communications network 150. For example, where the digital design application 114 serves web browser client applications, the digital design application 114 will be hosted by a web server which receives and responds (for example) to HTTP requests. Where the digital design application 114 serves native client applications, the digital design application 114 may be hosted by an application server configured to receive, process, and respond to specifically defined API calls received from those client applications. The image generation server 110 may include one or more web server applications and/or one or more application server applications allowing it to interact with both web and native client applications.

The digital design application 114 facilitates various functions related to creating and editing designs in the image generation server 110. This may include, for example, creating, editing, storing, searching, retrieving, and/or viewing designs. These designs may include one or more images generated using prompts based on nearest image captions, as described herein. The digital design application 114 may also facilitate additional functions that are typical of server systems—for example user account creation and management and user authentication. Each of these functionalities may be provided by individual applications, e.g., an account management application (not shown) for account creation and management, a management application (not shown) that is configured to maintain and store design templates and media items in the data storage.

The image generation system 116 is trained to receive text prompts and generate images based on the received text prompts. The image generation system 116 may incorporate a generative text-to-image ML model 118, which is the model that receives the modified prompts generated based on the nearest image captions and generates images based on the modified prompts, as described herein. In alternative embodiments the generative text-to-image ML model 118 is provided on computer processing hardware that is different to computer processing hardware, either locally as part of the image generation server 110, or remotely such as on another server accessible by the image generation server 110 through the network 150. In that case, the image generation system 116 communicates image generations requests to the generative text-to-image ML model 118 and receives the images generated responsive to the requests. Examples of generative text-to-image ML models include models called "Stable Diffusion", "DALL-E 2", "Midjourney" and "Imagen".

The prompt generation model 120 receives the user text prompts described herein and generates the modified text prompts for use by the image generation system 116 to generate images. The digital design application 114 may present a user interface for the user to input the user text prompt and may pass the user text prompt that is received to the prompt generation model 120. Alternatively, the prompt generation model 120 may form part of the digital design application 114. In other alternatives, the prompt generation model 120 is an independent application hosted by one or more different server systems.

The data storage application 122 executes to receive and process requests to persistently store and retrieve data. In particular, the data storage application 122 stores and retrieves data relevant to the operations performed/services provided by the digital design application 114, the image generation system 116 and the prompt generation model 120 (when all are on the image generation server 110).

The data storage application 122 may, for example, be a relational database management application or an alternative application for storing and retrieving data from data storage 126. Data storage 126 may be any appropriate data storage device (or set of devices), for example one or more nontransient computer readable storage devices such as hard disks, solid state drives, tape drives, or alternative computer readable storage devices.

In the image generation server 110, the digital design application 114 persistently stores data to data storage 126 via the data storage application 122. In alternative implementations, however, the digital design application 114 may be configured to directly interact with data storage devices such as 126 to store and retrieve data, in which case a separate data storage application 122 may not be needed. Furthermore, while a single data storage application 122 is described, the image generation server 110 may include multiple data storage applications.

The data storage 126 maintains data relevant to the operations performed/services provided by the digital design application 114, the image generation system 116 and the prompt generation model 120. In some embodiments, the data storage 126 includes design data 128 that stores data describing designs created by users, design templates and other design documents. The design data 128 may include images generated by, or caused to be generated by, the image generation system 116. These images may be within a design document (e.g. within a design document created by a user or within a design template).

The data storage 126 includes a vector database 130. The vector database 130 stores text embeddings, in particular text embeddings that are encoded image captions that were used to train the generative text-to-image ML model 118.

The data storage 126 includes an asset library 132 that stores design assets that may be utilized by the digital design application 114. The design asset library 132 may include amongst other data, a media library 134 (e.g. a library of media items such as images, vector graphics, videos and audio that may be utilized by a user of the digital design application 114 during design creation), a font library 136 (e.g. a library of fonts and font palettes) and a colour library 138 (e.g. a library of colours and colour palettes). An image in the media library 134 may have been generated, or cause to be generated, by the image generation system 116. For example, a user may request an image be generated based on a user text prompt and then request that the image be added to the media library 134.

Although a single data storage 126 is displayed in FIG. 1, it will be appreciated that the data storage 126 may include multiple individual data stores for storing different types of data. For example, one data store may be used for user account data, another for design data, another for design asset data, another implementing the vector database, and so forth.

As noted, the digital design application 114, the image generation system 116 and the prompt generation model 120 run on (or are executed by) computer processing hardware 112. Computer processing hardware 112 includes one or more computer processing systems.

The precise number and nature of those systems will depend on the architecture of the image generation server 110.

The present disclosure describes various operations that are performed by applications of the image generation server 110. It will be appreciated that the applications described may be combined into one or divided into two or more applications.

The client system 140 hosts a client application 142 which, when executed by the client system 140, configures the client system 140 to provide client-side functionality and to interact with the image generation server 110. Via the client application 142, and as discussed in detail below, a user can access the various techniques described herein—e.g., the user can input text prompts to generate images, view and/or preview images generated by the image generation server 110, create, edit, or publish one or more designs.

The client application 142 may be a general web browser application which accesses one or more of the applications of the image generation server 110 via an appropriate uniform resource locator (URL) and communicates with these server applications via general world-wide-web protocols (e.g. HTTP, HTTPS, FTP). Alternatively, the client application 142 may be a native application programmed to communicate with application(s) of the image generation server 110 using defined application programming interface (API) calls and responses.

The techniques and operations described herein are performed by one or more computer processing systems.

By way of example, client system 140 may be any computer processing system which is configured (or configurable) by hardware and/or software—e.g. client application 142—to offer client-side functionality. A client system 140 may be a desktop computer, laptop computer, tablet computing device, mobile/smart phone, or other appropriate computer processing system.

Similarly, the applications of the image generation server 110 are also executed by one or more computer processing systems (the computer processing hardware 112). Server computer processing systems will typically be server systems, though again may be any appropriate computer processing systems.

Figure 2:
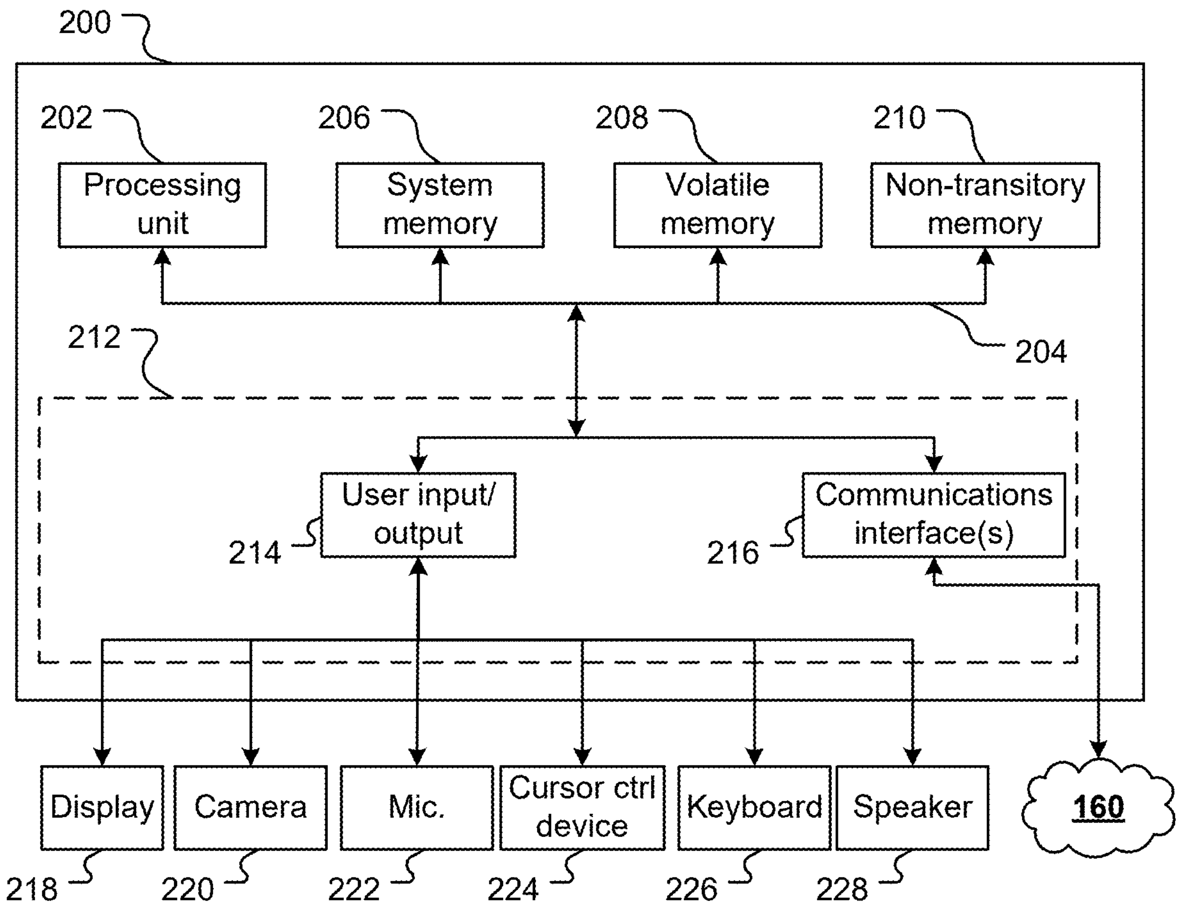
FIG. 2 is a block diagram of a computer processing system configurable to perform various features of the present disclosure.

FIG. 2 provides a block diagram of a computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted, however system 200 either carries a power supply or is configured for connection to a power supply (or both). It will also be appreciated that alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example system 200 includes a system memory 206 (e.g. a BIOS), volatile memory 208 (e.g. random-access memory such as one or more DRAM modules), and non-transitory memory 210 (e.g. one or more hard disk or solid-state drives).

System 200 also includes one or more interfaces, indicated generally by 212, via which system 200 interfaces with various devices and/or networks. Other devices may be integral with system 200 or may be separate thereto. Where a device is separate from system 200, the connection between the device and system 200 may be via wired or wireless hardware and communication protocols and may be a direct or an indirect (e.g. networked) connection.

Generally speaking, and depending on the system in question, devices to which the system 200 connects include one or more input devices to allow data to be input into/received by the system 200 and one or more output device to allow data to be output by the system 200.

By way of example, where the system 200 is a personal computing device such as a desktop or laptop device, it may include a display 218 (which may be a touch screen display and as such operate as both an input and output device), a camera device 220, a microphone device 222 (which may be integrated with the camera device), a cursor control device 224 (e.g. a mouse, trackpad, or other cursor control device), a keyboard 226, and a speaker device 228.

As another example, where the system 200 is a portable personal computing device such as a smart phone or tablet it may include a display 218 (which might be a touchscreen display), a camera device 220, a microphone device 222, and a speaker device 228.

Where the client application 142 operates to display controls, interfaces, or other objects, the client application 142 does so via one or more displays that are connected to (or integral with) system 200—e.g. display 218. Where the client application 142 operates to receive or detect user input, such input is provided via one or more input devices that are connected to (or integral with) system 200—e.g. touch screen forming part of the display 218, cursor control device 224, keyboard 226, and/or an alternative input device.

As another example, where the system 200 is a server computing device it may be remotely operable from another computing device via a communication network (e.g., network 150). Such a server may not itself need/require further peripherals such as a display, keyboard, cursor control device etc. (though may nonetheless be connectable to such devices via appropriate ports).

The system 200 also includes one or more communications interfaces 216 for communication with a network, such as network 150 of environment 100 (and/or a local network within the image generation server 110). Via the communications interface(s) 216, the system 200 can communicate data to and receive data from networked systems and/or devices.

The system 200 stores or has access to computer applications (which may also be referred to as computer software or computer programs). Such applications include computer readable instructions and data which, when executed by the processing unit 202, configure system 200 to receive, process, and output data. Instructions and data can be stored on non-transitory machine-readable medium such as 210 accessible to the system 200. Instructions and data may be transmitted to/received by the system 200 via a data signal in a transmission channel enabled (for example) by a wired or wireless network connection over an interface such as communications interface 216.

Typically, one application accessible to the system 200 will be an operating system application. In addition, the system 200 will store or have access to applications which, when executed by the processing unit 202, configure system 200 to perform various computer-implemented processing operations described herein. For example and referring to the networked environment of FIG. 1 above, image generation server 110 includes one or more systems which run the digital design application 114, the data storage application 122, the image generation system 116 and the prompt generation model 120. Similarly, the client system 140 runs the client application 142.

In some cases, part or all of a given computer-implemented method will be performed by system 200 itself, while in other cases processing may be performed by other devices in data communication with system 200.

Figure 3A:
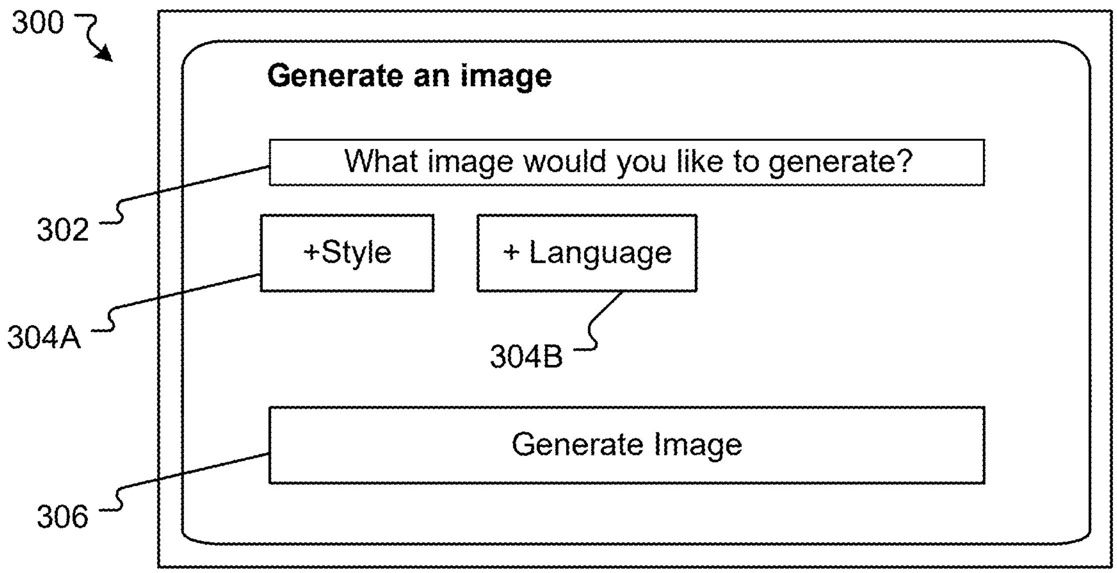
FIG. 3A is a diagrammatic representation of a user interface for entering a user text prompt for use in generating an image by a generative text-to-image machine-leaning model.
Figure 3B:
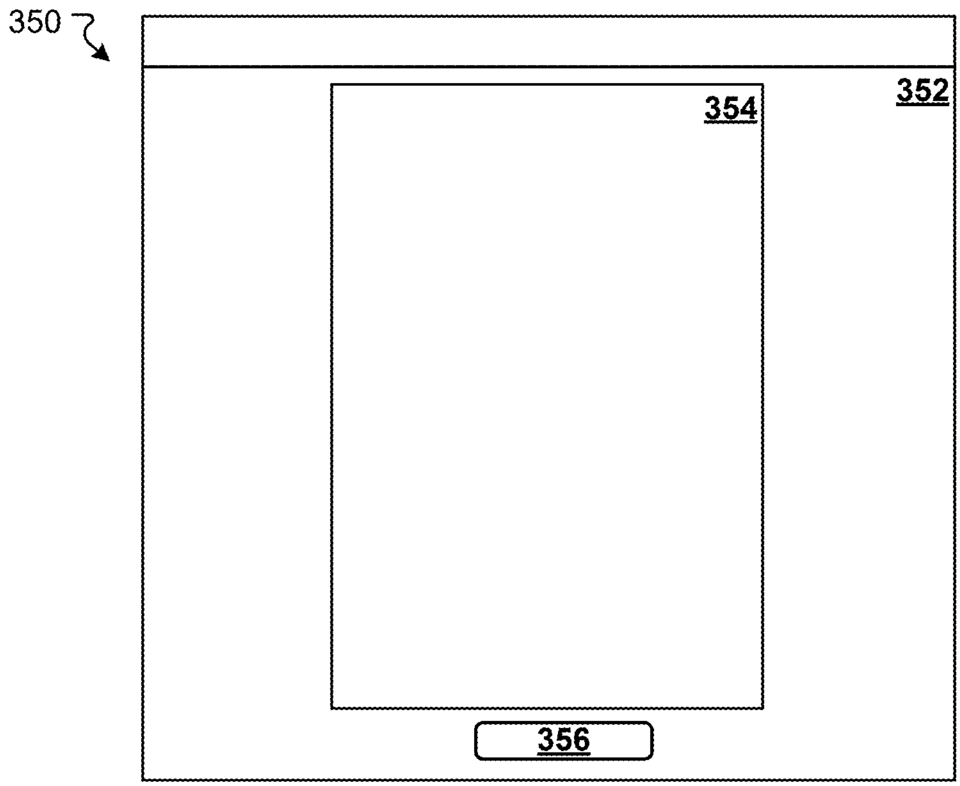
FIG. 3B is a diagrammatic representation of a user interface for creating or editing a design, which may include an image generated by a text-to-image machine-leaning model.

The client application 142 configures the client system 140 to provide an input user interface (UI) 300 and an editor user interface (UI) 350. The input UI 300 allows users to provide text prompts to generate images. The editor UI 350 allows a user to preview, view, create, edit, and output designs, which designs may include one or more images generated through operation of the input UI 300. FIG. 3A provides a simplified and partial example of an input UI 300 and FIG. 3B provides a simplified and partial example of an editor UI 350. In these examples the UIs 300, 350 are graphical user interfaces (GUI).

The input UI 300 includes a prompt input region 302. The prompt input region 302 may include a text field with placeholder text, for example, of “What image would you like to generate?” or alternative text, which directs a user to input their prompt in this region 302.

The UI 300 may optionally include one or more interactive controls 304A-B to add to the input prompt. The input UI 300 depicts three example interactive controls 304A-304C that can be utilized by a user to provide additional inputs. For example, the style interactive control 304A may be selected to specify a particular style for the image (e.g., photo-realistic, oil painting, abstract etc.). The language interactive control 304B may be selected to specify a language for any text in the image. Specifying a style, language or other parameter using the interactive controls adds predefined text to the user prompt. In a simple example the addition may be to preface the user text prompt with the words “Generate a photo-realistic image of”.

It will be appreciated that any type of interactive controls may be provided to allow a user to specify these additional parameters. In some examples, the interactive controls 304A-B may be buttons, which when selected display a pop-up window displaying a list of values the user can select from. In other examples the interactive controls 304A-B may be drop-down menus or text fields.

In addition, the UI 300 includes an interactive control, e.g., “Generate Image” control 306. Once the user has entered an input in the prompt input region 302 and (optionally) selected one or more of the interactive controls 304A-B (if any are provided), the user may select the generate design control 306. Selection of this control 306 causes an image to be generated using the methods described herein, in particular using one or more retrieved captions that are determined to be near the prompt entered in the prompt input region 302.

The editor UI 350 includes a design preview area 352. The design preview area 352 may, for example, be used to display a page 354 (or, in some cases multiple pages) of a design that is being created and/or edited. In this example an add image control 356 is provided which, if activated by a user, causes the UI 300 to be displayed. In practical implementations the editor UI 350 will include many more user interface elements, reflecting a multi-functional digital design application 114. For example, the editor UI 350 may include other controls that permit designs to be created, edited (by creating/adding design elements such as images, text, videos, and/or other elements), and output (e.g. saving, printing, publishing via social media, and/or other means) in various ways.

It will be appreciated that in UIs 300 and 350, selection of the various user input controls and text boxes can be done in various ways. For example, a user may type text directly into region 502 using a physical or virtual keyboard and/or select the one or more interactive controls using a keyboard or mouse. Alternatively, a user may enter text or select an interactive control by speaking. In such cases, words are captured by a microphone (e.g., microphone 222) and converted to text using appropriate speech-to-text software and then input into the one or more text boxes or used to select the one or more interactive controls.

Figure 4:
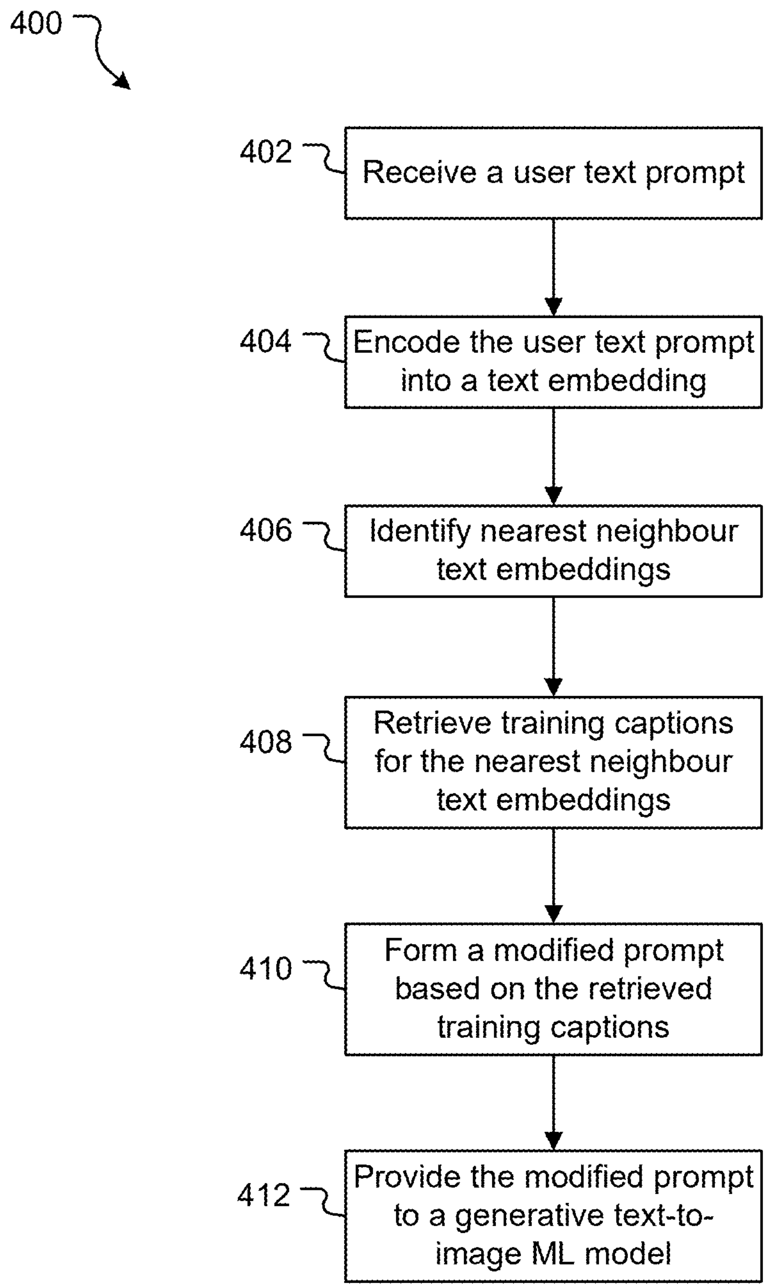
FIG. 4 is a flow diagram showing a method for forming modified prompts for a generative text-to-image machine learning model based on nearest neighbour text embeddings.

FIG. 4 shows a flow diagram of a method of forming a modified prompt for input to a generative text-to-image ML model and providing the modified prompt to the generative text-to-image ML model for image generation. The method may be a computer-implemented method. For example, the method may be implemented by the networked environment 100 described with reference to FIG. 1, or the computer processing system 200 described with reference to FIG. 2. An example implementation with reference to FIG. 1 and FIG. 2 is assumed in the following description of FIG. 4.

In step 402, a user text prompt is received. The user text prompt may have been entered at the client system 140 utilising the user input/output 214. For example, a user may have operated the keyboard 226 to enter the user text prompt, with the computer processing system 200 providing guidance and feedback to the user by causing a field to be displayed on the display 218. An example input UI 300 was described with reference to FIG. 3A. The user interface may, for example, form part of the digital design application 114, or the prompt generation model 120. The client application 142 may cause the client system 140 to communicate the user text prompt to the image generation server 110.

In step 404, the image generation server 110 encodes the user text prompt into a text embedding. The encoding may be performed by the prompt generation model 120. As described previously herein the text embedding is a vector. The transformation of the text prompt into a text embedding allows vector operations to be performed, including a nearest neighbour search.

In step 406 a nearest neighbour search is conducted with text embeddings in the vector database 130. The search may be performed by the prompt generation model 120. As previously described these text embeddings correspond to training captions of images used to train a generative text-to-image ML model, which in this example is the generative text-to-image ML model 118. In some embodiments the three nearest neighbour text embeddings are identified.

In step 408, the training captions corresponding to the identified one or more near neighbour text embeddings are retrieved. For example, the prompt generation model 120 may retrieve from the vector database the training captions, which may be stored associated with their respective text embedding to enable the retrieval. The vector database 130 may comprise two or more storage devices, for example one containing the text embeddings and another containing a mapping of the text embeddings to the text captions that were encoded to form the text embeddings.

In step 408 the prompt generation model 120 forms a modified prompt based on the retrieved training captions. As described herein, the modified prompt may be formed in any of several different ways, some of which include the user text prompt and some of which do not, some of which utilise a LLM to expand the text prompt and some do not. An example LLM for generating a modified prompt is GPT3.5.

In step 412 the modified prompt is provided to the generative text-to-image machine learning model 118. The generative text-to-image machine learning model 118 generates one or more images. The generated images may be provided to the user (who provided the user text prompt), for example through display on the display 218. The generated image(s) may be incorporated into a design, in which case the images may be displayed as part of editor UI 350. The generated image(s) may be stored in memory for subsequent retrieval and use, for example non-transitory memory 210 or media library 134.

In the above embodiments certain operations may be described as performed by the client system 140 (e.g. under control of the client application 140) and other operations may be described as performed at the image generation server 110. Variations are, however, possible. For example, in certain cases an operation described as being performed by client system 140 may be performed at the server 110 and, similarly, an operation described as being performed at the server 110 may be performed by the client system 140. Where user input is required such user input is typically initially received at the client system 140 (by an input device thereof). Data representing that user input may be processed by one or more applications running on client system 140 or may be communicated to server environment 110 for one or more applications running on the server hardware 112 to process. Similarly, data or information that is to be output by a client system 140 (e.g. via display, speaker, or other output device) will ultimately involve that system 140. The data/information that is output may, however, be generated (or based on data generated) by client application 142 and/or the server environment 110 (and communicated to the client system 140 to be output).

A specific implementation and example that illustrates an advantage that embodiments of the present disclosure may provide, for at least some use cases, will now be briefly described. The example utilises a user text prompt "5 photo collage with shades of purple Instagram posts Memories captured, moments cherished" and T5-xl was used as the encoder to generate text embeddings.

A nearest neighbour search of a set of text embeddings of training captions that were used in the training of a text-to-image ML model, in this example a text-to-image diffusion model, returned text embeddings corresponding to the following three captions A) to C). The inventor has found three captions to be an effective number of captions to use. Nearest neighbour captions:

A) This design presents a collage of polaroid-style photos arranged against a pastel pink and purple gradient background. The images feature a consistent color scheme with hues of pink and lilac, showcasing fashion elements such as clothing, accessories, flowers, and makeup items. The overall aesthetic is unified and feminine, and there's a social media handle "@reallygreatsite" positioned at the bottom, suggesting the collage is a curated representation of a brand or personal style meant for social media promotion.

B) This design consists of a collage of images unified by a purple color theme, likely aimed at conveying a theme related to beauty or cosmetics. The images include close-ups of beauty products like nail polish and lipstick, a hand displaying nail art, and natural elements like flowers, which add an organic touch to the composition. The layout features geometric shapes with circular and square elements that intersect and overlay the images, creating a modern and dynamic look.

C) The design is a collage of Polaroid-style images with a pastel color theme, predominantly in shades of pink and purple. The images feature fashion elements such as clothing, shoes, and accessories, as well as a person posing with these items. The overall aesthetic is soft and feminine, enhanced by the floral graphics and a gradual background that transitions from pink to blue. There is a social media handle "@reallygreatsite" at the bottom center, suggesting that the collage could be a promotional piece for a fashion-related social media account or website.

The text prompt and the nearest neighbour captions were combined into structured text provided to the large language model GPT3.5. A first prompt expansion generated by GPT3.5 based on the user text prompt was: "A background with five photo frames arranged in a collage format, each outlined in shades of purple. The center features an empty rectangular backdrop. The surrounding area includes subtle accents like lavender blooms, light gradients, and abstract swirls to enhance the purple theme."

A second prompt expansion generated by GPT3.5 based on the user text prompt and the three nearest neighbour captions was: "A five-photo collage set against a gradient background transitioning from deep purple to lavender. The images feature a cohesive purple theme, showcasing moments such as friends laughing, scenic landscapes, and close-ups of cherished objects. The layout includes Polaroid-style frames and delicate decorative elements like small stars and floral motifs, creating a nostalgic and visually appealing design."

In response to the first prompt expansion, the diffusion model generated blank photo frames in the output, together with the words "Memories captured, moments cherished". It appeared that there was a lack of understanding of the significance of "5 photo collage" and that there was a failure to accurately describe the content of the photo frames. In response to the second prompt expansion, a higher prompt adherence was achieved. The images included photographs with content distributed above and below the text "Memories captured, moments cherished".

Figure 5A:
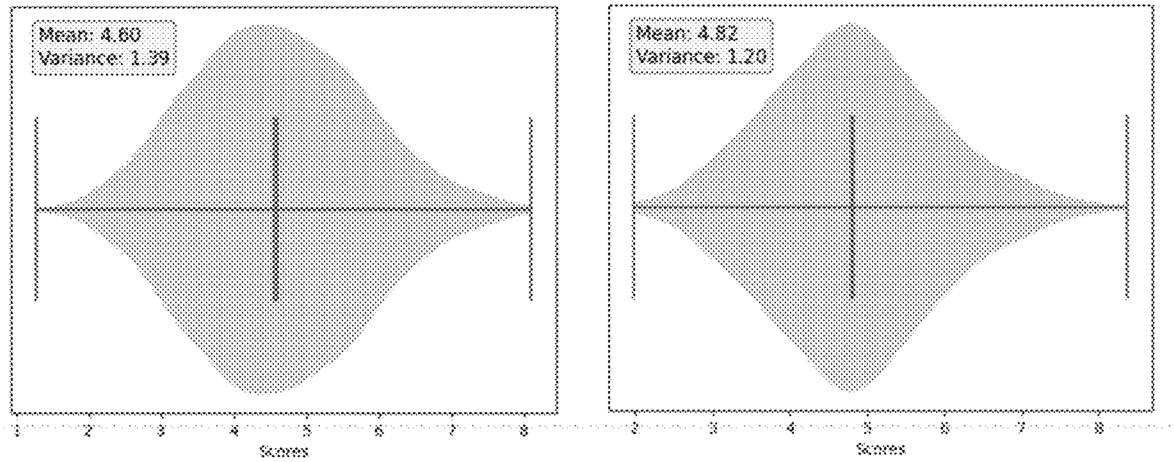
FIG. 5A and FIG. 5B illustrate plots of a score of image captions and expanded image prompts by a large language model, showing a difference arising from utilising nearest neighbour text embeddings.
Figure 5B:
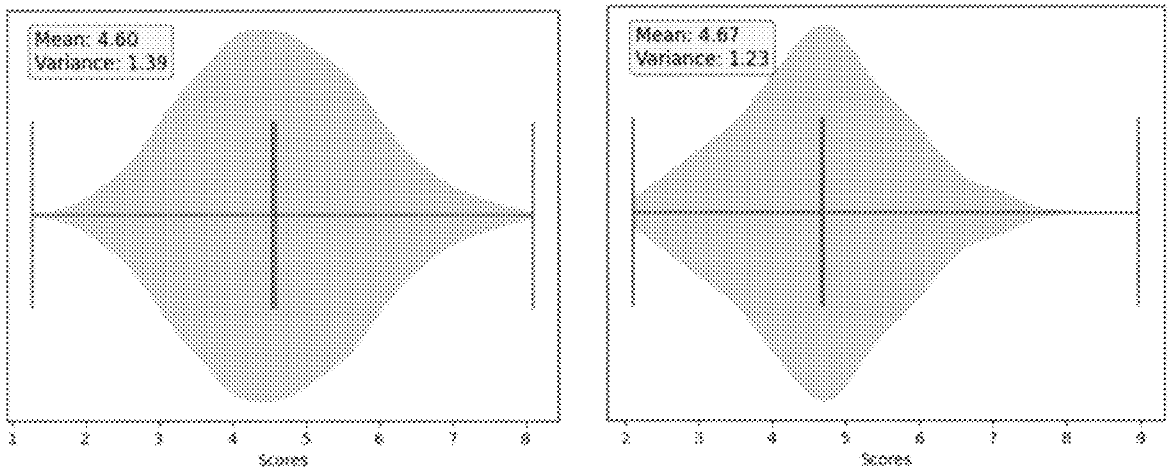

FIG. 5A and FIG. 5B show plots of a distribution of a visual quality model (VQM) score of user prompts. The details of the VOM model are omitted, as the figures are included to show a change by using nearest neighbour image captions. In the VQM score a lower value is better. The left plot in FIG. 5A is the score distribution over 800 image captions (it will be understood that these image captions may be used for training a text-to-image ML model, although in many practical applications the number of captions may be much higher). The mean is 4.60 and the variance 1.39. The right plot in FIG. 5A shows the same over 800 user prompts expanded by GPT 3.5. The mean is 4.82 and the variance is 1.20.

The left plot in FIG. 5B is the same score distribution over 800 image captions as shown in FIG. 5A and the right plot in FIG. 5B is the same over 800 user prompts expanded by GPT 3.5 based on both the user prompt and three nearest neighbour image captions. The mean of the right plot is 4.67 (substantially lower than the right plot of FIG. 5A and significantly closer to the mean for the image captions) and the variance is 1.23.

The flowchart illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

In the above description, certain operations and features are explicitly described as being optional. This should not be interpreted as indicating that if an operation or feature is not explicitly described as being optional it should be considered essential. Even if an operation or feature is not explicitly described as being optional it may still be optional.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless otherwise stated: a recitation of "a", "an" or "the" is intended to mean "one or more"; "or" is intended to mean an "inclusive or," and not an "exclusive or"; and the term "based on" is intended to mean "based at least in part on".

In some instances, the present disclosure and/or claims may use the terms "first," "second," etc. to identify and distinguish between elements or features. When used in this way, these terms are not used in an ordinal sense and are not intended to imply any particular order.

Furthermore, when used to differentiate elements or features, a second element or feature could exist without a first and the presence of a first element or feature does not imply the existence of a second element or feature.

It will be understood that the embodiments disclosed and defined in this specification extend to alternative combinations of two or more of the individual features mentioned in or evident from the text or drawings. All these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method for generating media items or digital assets, the method comprising:
- receiving a text prompt;
- encoding, by an encoder implementing an encoding process, the text prompt into a text embedding;
- identifying one or more similar text embeddings to the encoded text prompt from a database of text embeddings, wherein the text embeddings in the database comprise or consist of training captions that were used to train a generative machine learning model encoded using the encoding process;
- retrieving one or more training captions corresponding to the identified one or more similar text embeddings;
- forming a modified prompt based on the retrieved training captions; and
- providing the modified prompt to the generative machine learning model to generate one or more media items or digital assets.

2. The method of claim 1, wherein forming the modified prompt comprises combining the received text prompt with the one or more retrieved training captions.

3. The method of claim 1, wherein the modified prompt does not include the received text prompt.

4. The method of claim 1, wherein forming the modified prompt comprises generating the modified prompt using a large language model, wherein the large language model generates the modified prompt based on text input comprising at least the one or more retrieved training captions.

5. The method of claim 4, wherein the text input comprises both the received text prompt and the one or more retrieved training captions.

6. The method of claim 4, wherein the text input comprises the one or more retrieved training captions without the received text prompt.

7. The method of claim 1, wherein the one or more similar text embeddings are one or more near neighbour text embeddings.

8. The method of claim 1, wherein the one or more similar text embeddings consist of at least three near neighbour text embeddings.

9. The method of claim 1, wherein the encoder comprises a large pre-trained language processing model.

10. The method claim 1, wherein the one or more similar text embeddings comprise or consist nearest neighbour text embeddings to the encoded received text prompt.

11. The method of claim 1, wherein the received text prompt comprises or consists of text entered by a user.

12. A computer-implemented method for generating a prompt for a generative machine learning model, the method comprising:

receiving a text prompt;

encoding, by an encoder implementing an encoding process, the received text prompt into a text embedding;

identifying one or more similar text embeddings to the encoded received text prompt from a database of text embeddings, wherein the text embeddings in the database comprise or consist of training captions that were used to train the generative machine learning model encoded using the encoding process;

retrieving one or more training captions corresponding to the identified one or more similar text embeddings; and generating a modified prompt based on the retrieved training captions.

13. The method of claim 12, further comprising providing the modified prompt to the generative machine learning model.

14. The method of claim 12, wherein forming the modified prompt comprises generating the modified prompt using a large language model, wherein the large language model generates the modified prompt based on text input comprising at least the one or more retrieved training captions.

15. The method of claim 14, wherein the text input comprises both the received text prompt and the one or more retrieved training captions.

16. The method of claim 15, wherein the one or more similar text embeddings consist of a plurality of near neighbour text embeddings.

17. The method of claim 15, wherein the one or more similar text embeddings consist of at least three near neighbour text embeddings.

18. The method of claim 12, wherein the encoder comprises a large pre-trained language processing model.

19. The method of claim 12, wherein the received text prompt comprises or consists of text entered by a user.

20. Non-transitory storage storing instructions executable by one or more processing units to cause the one or more processing units to perform a method, the method comprising:

receiving a text prompt;

encoding, by an encoder implementing an encoding process, the received text prompt into a text embedding;

identifying one or more similar text embeddings to the encoded text prompt from a database of text embeddings, wherein the text embeddings in the database comprise or consist of training captions that were used to train the generative machine learning model encoded using the encoding process;

retrieving one or more training captions corresponding to the identified one or more similar text embeddings; and generating a modified prompt based on the retrieved training captions.

* * * * *